United States Patent
Cao et al.

(10) Patent No.: US 9,591,683 B2
(45) Date of Patent: Mar. 7, 2017

(54) SYSTEM AND METHOD FOR ADAPTIVE COOPERATION MODE SELECTION STRATEGIES FOR WIRELESS NETWORKS

(71) Applicant: Huawei Technologies Co., Ltd., Shenzhen (CN)

(72) Inventors: Yu Cao, Kanata (CA); Amine Maaref, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 14/503,007

(22) Filed: Sep. 30, 2014

(65) Prior Publication Data

US 2016/0095128 A1 Mar. 31, 2016

(51) Int. Cl.
*H04W 4/00* (2009.01)
*H04W 76/02* (2009.01)
*H04W 88/04* (2009.01)

(52) U.S. Cl.
CPC ......... *H04W 76/023* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2008/0176566 A1* | 7/2008 | Akita | H04W 36/32 455/436 |
| 2010/0240400 A1* | 9/2010 | Choi | H04W 68/02 455/458 |
| 2010/0297936 A1* | 11/2010 | Nan | H04L 1/1812 455/7 |
| 2011/0188393 A1* | 8/2011 | Mallik | H04B 7/024 370/252 |
| 2012/0120838 A1* | 5/2012 | Farajidana | H04B 7/024 370/252 |
| 2012/0250557 A1* | 10/2012 | Zirwas | H04W 72/1231 370/252 |

(Continued)

FOREIGN PATENT DOCUMENTS

| | | |
|---|---|---|
| CN | 102948173 A | 2/2013 |
| CN | 103188815 A | 7/2013 |

(Continued)

*Primary Examiner* — Phirin Sam
(74) *Attorney, Agent, or Firm* — Slater Matsil, LLP (57) ABSTRACT

Embodiments are provided for adaptive user equipment (UE) cooperation mode selection in wireless networks. An adaptive UE cooperation strategy is implemented, which adaptively switches between a Decode-and-Forward (D&F) mode and a soft UE combining mode that involves combining, at the TUE, signals from multiple cooperating UEs (CUEs). A method by a network component includes obtaining access link qualities for links between a base station and a plurality of CUEs for a target UE (TUE). A UE cooperation mode or a hybrid UE cooperation mode is then selected from a plurality of supported UE cooperation modes according to the access link qualities of the CUEs. At least one of the CUEs is then instructed to cooperate in forwarding the signals to the TUE using the selected UE cooperation mode. The CUEs can dynamically opt out of the UE cooperation according to the channel quality of the CUEs or TUE.

35 Claims, 4 Drawing Sheets

(56) References Cited

U.S. PATENT DOCUMENTS

| | | | |
|---|---|---|---|
| 2013/0044685 A1* | 2/2013 | Fong | H04J 11/0053 370/328 |
| 2013/0064213 A1* | 3/2013 | Park | H04W 76/023 370/329 |
| 2013/0089020 A1 | 4/2013 | Hakola et al. | |
| 2013/0223272 A1* | 8/2013 | Tao | H04B 7/024 370/252 |
| 2014/0171094 A1* | 6/2014 | Noh | H04W 40/22 455/452.1 |
| 2014/0293874 A1* | 10/2014 | Oh | H04B 7/024 370/328 |
| 2015/0103764 A1* | 4/2015 | Deng | H04W 24/10 370/329 |

FOREIGN PATENT DOCUMENTS

| | | |
|---|---|---|
| CN | 103326814 A | 9/2013 |
| WO | 2014053102 A1 | 4/2014 |
| WO | 2014090204 A1 | 6/2014 |
| WO | 2014094601 A1 | 6/2014 |

* cited by examiner

SYSTEM AND METHOD FOR ADAPTIVE COOPERATION MODE SELECTION STRATEGIES FOR WIRELESS NETWORKS

TECHNICAL FIELD

The present invention relates to the field of wireless communications, and, in particular embodiments, to a system and method for adaptive cooperation mode selection strategies for wireless networks.

BACKGROUND

In wireless or cellular systems, device-to-device (D2D) transmission can be exploited to enable user equipment (UE) cooperation. UE cooperation can significantly increase both throughput and coverage. Different cooperation protocols can be applied, such as Decode-and-Forward (D&F), Amplify-and-Forward (A&F), and other UE cooperation strategies. However, different UE cooperation protocols or strategies are typically best suited for different scenarios. For example, D&F is a suitable scheme in the case of a degraded relay channel. This scheme performs better when cooperating UEs (CUEs) have substantially higher access link quality than a target UE (TUE). The CUEs cooperate in forwarding signals from the network to the TUE. However, in order to be implemented, D&F requires at least one of the UEs to be able to decode the received signal, which limits its performance in some scenarios. There is a need for a scheme that provides a best or better UE cooperation strategy suitable for different scenarios in the network.

SUMMARY OF THE INVENTION

In accordance with an embodiment of the disclosure, a method by a network component for adaptive user equipment (UE) cooperation mode selection in wireless networks includes obtaining access link quality of a plurality of cooperating UEs (CUEs) for a target UE (TUE) intended to receive signals from a wireless network. The method further includes selecting a UE cooperation mode or a hybrid UE cooperation mode from a plurality of supported UE cooperation modes according to the access link quality of the CUEs. One of the CUEs is then instructed to cooperate in forwarding the signals to the TUE using the selected UE cooperation mode.

In accordance with another embodiment of the disclosure, a network component for adaptive UE cooperation mode selection in wireless networks includes at least one processor and a non-transitory computer readable storage medium storing programming for execution by the processor. The programming includes instructions to obtain access link quality for a link between a base station of a wireless network and a CUE for a TUE intended to receive signals from a wireless network. The programming further includes instructions to select a UE cooperation mode or a hybrid UE cooperation mode from a plurality of supported UE cooperation modes according to the access link quality of the CUE. The network component is further configured to instruct the CUE to cooperate in forwarding the signals to the TUE using the selected UE cooperation mode.

In accordance with another embodiment of the disclosure, a method by a network component for adaptive UE cooperation mode selection in wireless networks includes obtaining, from a plurality of CUEs for a TUE intended to receive signals from a wireless network, preferences for selecting a UE cooperation mode from a plurality of supported UE cooperation modes. The preferences are in accordance with access link quality of the CUEs. The method further includes selecting a UE cooperation mode or a hybrid UE cooperation mode from the plurality of supported UE cooperation modes according to the preferences from the CUEs. One of the CUEs is then instructed to cooperate in forwarding the signals to the TUE using the selected UE cooperation mode.

In accordance with another embodiment of the disclosure, a network component for adaptive UE cooperation mode selection in wireless networks includes at least one processor and a non-transitory computer readable storage medium storing programming for execution by the processor. The programming includes instructions to obtain, from a CUE for a TUE intended to receive signals from a wireless network, preferences for selecting a UE cooperation mode from a plurality of supported UE cooperation modes. The preferences are in accordance with access link quality for a link of the CUE. The programming further includes instructions to select a UE cooperation mode or a hybrid UE cooperation mode from the plurality of supported UE cooperation modes according to the preferences from the CUE. The network component is further configured to instruct the CUE to cooperate in forwarding the signals to the TUE using the selected UE cooperation mode.

In accordance with another embodiment of the disclosure, a method by a UE for adaptive UE cooperation mode selection in wireless networks includes receiving, from a coordinating entity, an indication to cooperate in forwarding signals to a TUE using a selected UE cooperation mode from a plurality of supported UE cooperation modes. The selected UE cooperation mode is in accordance with access link quality of a plurality of CUEs. The method further includes, according to link quality of the UE or the TUE, performing one of participating in UE cooperation to forward the signals to the TUE or entering a sleep mode.

In accordance with another embodiment of the disclosure, a UE supporting adaptive UE cooperation mode selection in wireless networks includes at least one processor and a non-transitory computer readable storage medium storing programming for execution by the processor. The programming includes instructions to receive, from a coordinating entity, an indication to cooperate in forwarding signals to a TUE using a selected UE cooperation mode from a plurality of supported UE cooperation modes. The selected UE cooperation mode is in accordance with access link quality of a plurality of CUEs. The programming includes further instructions to, according to link quality of the UE or the TUE, perform one of participating in UE cooperation to forward the signals to the TUE or entering a sleep mode.

In accordance with another embodiment of the disclosure, a method by a UE for adaptive cooperation mode selection in wireless networks includes selecting, according to access link quality of the UE, a UE cooperation mode from a plurality of supported UE cooperation modes for forwarding signals by multiple CUEs to a TUE. The UE is one of the CUEs, and the UE cooperation mode is selected by the UE independent of other CUEs. The TUE is then informed of the selected UE cooperation mode.

In accordance with yet another embodiment of the disclosure, a UE for adaptive cooperation mode selection in wireless networks includes at least one processor and a non-transitory computer readable storage medium storing programming for execution by the processor. The programming includes instructions to select, according to access link quality of the UE, a UE cooperation mode from a plurality of supported UE cooperation modes for forwarding signals by multiple CUEs to a TUE. The UE is one of the CUEs, and the UE cooperation mode is selected by the UE independent of other CUEs. The UE is further configured to inform the TUE of the selected UE cooperation mode.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments, including systems, methods, and signaling mechanisms, are provided herein for adaptive UE cooperation mode selection for wireless networks. An adaptive UE cooperation strategy is disclosed, which adaptively switches between a D&F mode and a soft UE combining mode that involves combining, at the TUE, signals from multiple CUEs, such as selective log-likelihood ratio (LLR) forwarding mode. The selective LLR forwarding scheme is a frequency selective scheduling (FSS) based selection forwarding scheme that can achieve better performance when cooperating UEs (CUEs) and a target UE (TUE) are relatively close to each other. However, using the selective LLR forwarding, the amount of bandwidth/time resource usage on the device-to-device (D2D) links is higher than the D&F approach which increases operation complexity. The adaptive cooperation mode selection herein can be selected semi-statically based on long term access link qualities of the CUEs. The long term link quality is assessed over a relatively long operation time of the CUEs. In an embodiment, a centralized adaptive cooperation mode selection is implemented, where a centralized controller (CCL), such as a Base Station (BS), is responsible for the cooperation mode selection. In another embodiment, a coordinated self-adaptive cooperation mode selection is implemented, where each CUE indicates its own cooperation mode preference and a coordinating entity (e.g., the TUE) coordinates between the CUEs to make the final decision. In another embodiment, a hybrid UE cooperation mode selection scheme can be implemented, where different CUEs may simultaneously operate in different cooperation modes. In all embodiments, the CUEs can be dynamically silenced (opt out of cooperation) within each cooperation mode (D&F or selective LLR forwarding) to further save UE power and resource usage. It should be understood by those skilled in the art, that in many cases the term CUE link quality is used to refer to the quality of the link between a BS and the CUE. In other embodiments CUE link quality may alternatively refer to the quality of a link from the BS to the TUE which is routed through the CUE.

Previous UE cooperation protocols which generalize D&F and A&F, such as hybrid decode-amplify-and-forward protocols (HDAF), do not consider system level adaptive mode selection. In addition, signaling aspects and selection criteria for different modes are not considered in such schemes. The adaptive cooperation mode selection scheme herein adaptively selects between the D&F and the selective forwarding depending on the current access link qualities and other considerations as described below. Two UE cooperation mode selection schemes or methods are included. A first scheme is a centralized adaptive cooperation mode selection. In this selection scheme, a centralized controller (e.g., a BS) configures each CUE to operate in one of the two operating modes: D&F and selective LLR forwarding (also referred to herein as soft combining). A second scheme is a coordinated self-adaptive cooperation mode selection, where each CUE semi-statically informs a coordinating entity (e.g., the TUE) within the virtual receiver (the group of CUEs and TUE) on which cooperation mode is recommended based on its own access link quality with the network, such as between the UE and a BS. The coordinating entity selects the cooperation mode for all the CUEs and informs the CUEs about its decision.

During the adaptive mode selection, within each of the two alternative operating modes (D&F and soft combining mode), each CUE can also be dynamically configured to be silent (opt out of the cooperation) based on its own short term access link quality. This dynamic silencing can significantly save unnecessary UE power consumption and D2D resource usage. Other benefits of the adaptive mode selection include reducing cooperation overhead. The adaptive selection also leverages the benefits of the D&F mode in degraded channel and of the selective LLR forwarding mode in non-degraded channel. The simplicity of D&F is combined with performance improvement of selective LLR forwarding. Further, Channel Quality Indicator (CQI)/Precoding Matrix Indicator (PMI) feedback and modulation coding scheme (MCS) adaptation can be adapted based on prior knowledge of the cooperation mode selection.

Figure 1:
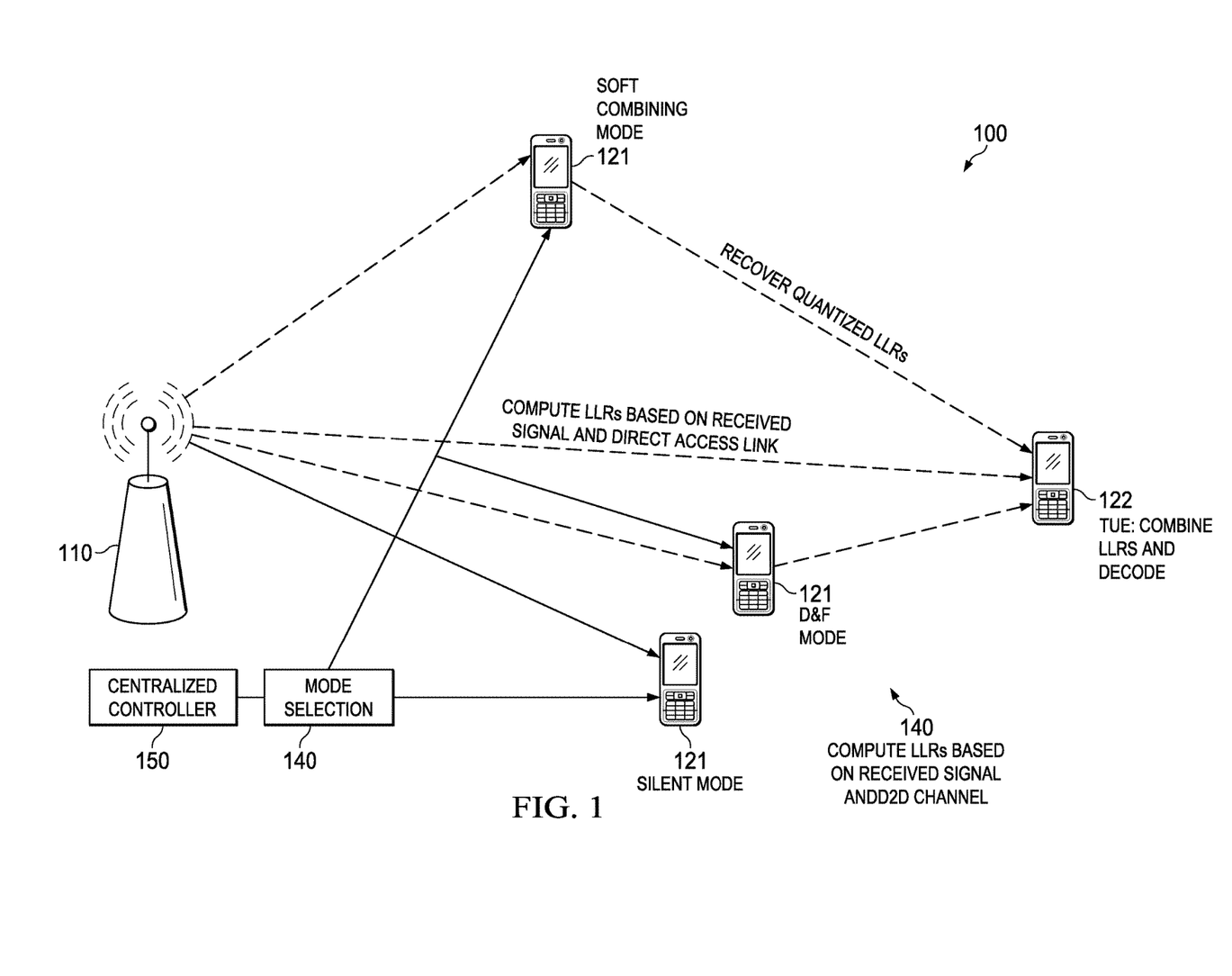
FIG. 1 illustrates an embodiment of a network controlled adaptive cooperation mode selection.

FIG. 1 illustrates an embodiment of a network controlled adaptive cooperation mode selection scheme 100. In the scheme 100, a centralized controller (CCL) 150 is responsible for the decision of mode selection. The CCL 150 can be an entity connected to the network such as an eNB or BS 110, a virtual transmitter (a group of components jointly transmitting), or a separate entity related to the UE cooperation group. The CUEs 121 can be pre-selected for a TUE 122 via a UE discovery process or a network assisted approach. The selection of CUEs 121 can be based on long term geometry of D2D links to make sure each selected CUE 121 has a relatively good D2D link for cooperation. Each CUE 121 measures its long term access link quality with the network, e.g., with a BS, based on pilot signal and reports them to the CCL 150. Based on the long term access link qualities of all CUEs 121, the CCL 150 determines mode selection and directs one or more of the CUEs 121 to operate in one of the following two modes. The mode selection can be determined based on a utility function involving signal to interference-plus-noise ratio (SINR) of long term access link quality. Any CUE 121 can also opt not participate in the cooperation mode and thus stay or switch into silent mode. This determination can be based on its own short term access link quality or to save power.

If the CCL 150 configures the at least one of the CUEs 121 to operate in the D&F mode, each CUE 121 attempts to decode the information, and if successful re-encodes and forwards it to the TUE 122. The TUE 122 combines the signals received from the CUEs 121 in the second phase and the signals received directly from the BS 110 in the first phase to perform decoding. If the CCL 150 configures the at least one of the CUEs 121 to operate in the soft combining mode, each CUE 121 uses the FSS-based selective LLR forwarding protocol to forward the signal to the TUE 122. The soft combining mode can also be generalized to include A&F and Compress-and-Forward (C&F) protocols.

As discussed before, the D&F protocol performs best if the access link quality of at least one CUE 121 is much better than that of the TUE 122. In the case where no CUE 121 can decode the information, the D&F protocol does not work properly. Since the D2D link quality should be good enough due to the CUE 121 selection process, the selection criteria can be a general utility/cost function of long term access link SINR of all the CUEs 121.

Figure 2:
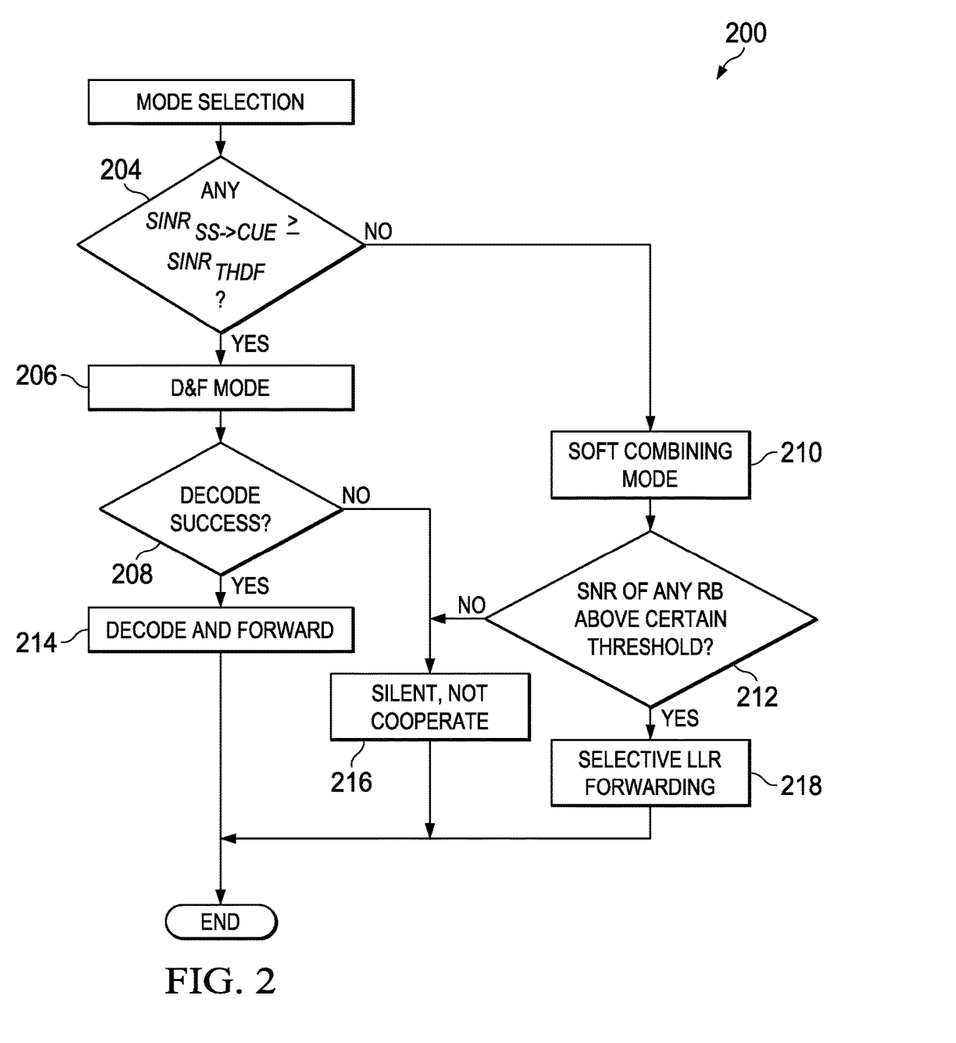
FIG. 2 illustrates an embodiment of a method for centralized cooperation mode selection.

FIG. 2 illustrates an embodiment of a method 200 for centralized cooperation mode selection. The method can be implemented by a mode selection entity, e.g., the CCL 150 or the BS 110. At step 204, the mode selection entity selects one of the two UE cooperation modes, or alternatively a hybrid mode where different CUEs simultaneously operate in different cooperation modes, according to a threshold based selection criterion. If the SINR of the signal from the BS to any CUE ($SINR_{BS\_CUE}$) is greater than or equal to a predefined threshold ($SINR_{THDF}$), then the method 200 proceeds to step 206 where one or more of the CUEs operate in D&F mode. Otherwise, the method 200 proceeds to step 210 where one or more of the CUEs operate in the selective LLR forwarding mode. In one implementation, if the MCS is known, then the threshold can be set to the SINR level where a CUE 121 can decode with high probability. In another implementation, the threshold can be set to a certain level above the TUE access link with the BS 110.

In the D&F mode, at step 208, each CUE determines whether it can decode the received signal properly, for example, if the CUE has the decoding capability or sufficient short term access link quality for a link between the CUE and the network, e.g., a BS or eNB of the network. If the condition in step 208 is satisfied, the signal is decoded and forwarded to the TUE at step 214. If the condition in step 208 is not satisfied, the CUE enters silent mode at step 216 and does not cooperate in the forwarding to the TUE. In the selective LLR forwarding mode, at step 212, each CUE determines whether its SINR of any resource block (RB) is above the defined threshold. If this condition is true, the CUE performs selective LLR forwarding at step 218. Otherwise, the CUE enters silent mode at step 216 and does not cooperate in the forwarding to the TUE. As such, within each selection mode, a CUE can be dynamically silenced, e.g., opt out of the cooperation temporally according to its short term access link quality.

Dynamic silencing can significantly save UE power consumption and preserve D2D bandwidth resource usage, such as for other more beneficial cooperation scenarios. Dynamic silencing can be done based on one or multiple conditions. For instance, if the TUE already has a very good short term access link, the CUE cooperation is not needed. As an example, the SINR at the TUE is compared to a defined threshold such as $SINR_{TUE} \geq SINR_{THTUE}$. Another condition is when there are enough other CUEs with better access link quality that are available for cooperation. For example, if the maximum number of CUEs that can participate in the cooperation is set to be K (K is an integer), the condition hence becomes: if there are more than K CUEs with better SINR than a certain CUE, then the CUE is silenced. These two conditions require the CCL or mode selection entity to collect either the TUE's short term access link quality or all the CUEs' short term link qualities. Thus, silencing due to these conditions is implemented by the CCL. In one implementation, in D&F mode, the condition may be: if the CUE fails to decode, it is silenced (does not cooperate). In soft combining mode, the condition may be: if access link quality of all frequency bands of the CUE are below a certain threshold, then the CUE is silenced. These two conditions can be independently decided by the CUE.

The centralized mode selection scheme requires the CCL to collect the long term SINR information of access link. Another approach is a semi-distributed approach where each CUE makes its initial decision by itself based on its own long term access link quality. However, a completely distributed approach means that CUEs may operate in a mix of D&F and soft combining mode. To simplify the overall system, a coordinated approach can be adopted.

Figure 3:
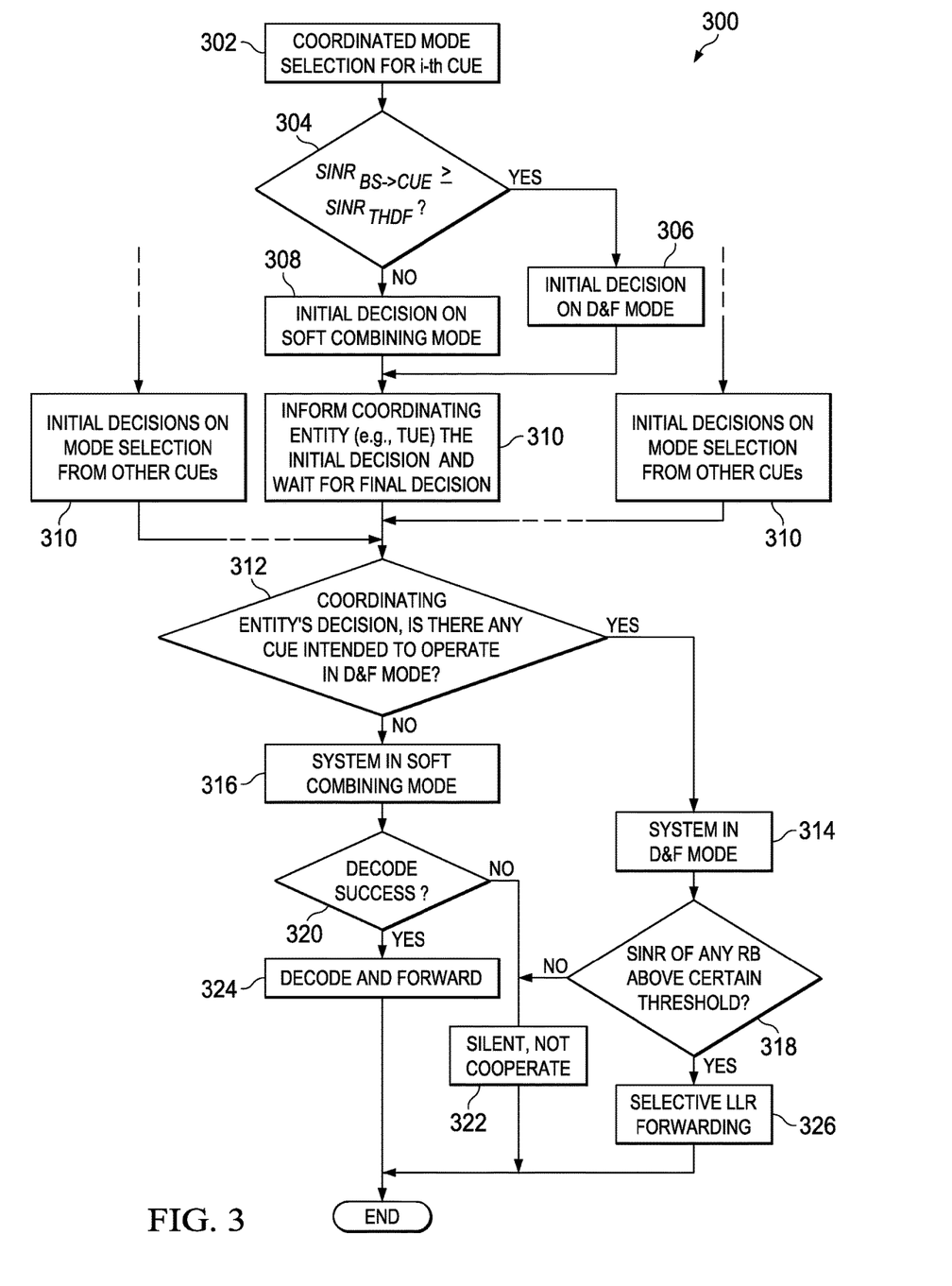
FIG. 3 illustrates an embodiment of a method for coordinated cooperation mode selection.

FIG. 3 illustrates an embodiment of a method 300 for coordinated cooperation mode selection. The method 300 is implemented among participating CUEs. In this approach, each CUE semi-statically updates its preferred cooperation mode between D&F and selective LLR forwarding, based on whether its long term access link quality is above some threshold. At step 304, each CUE decides its own preferred cooperation mode based on its own long term access link quality for a link between the CUE and the network, e.g., a BS or eNB of the network. The CUE selects one of the two UE cooperation modes according to a threshold based selection criterion. If the SINR of the signal from the BS to the CUE ($SINR_{BS\_CHE}$) is greater than or equal to a predefined threshold ($SINR_{THDF}$), then the method 300 proceeds to step 306 where the CUE initially selects the D&F mode. If this condition is not satisfied, then the method 300 proceeds to step 308 where the CUE initially selects the soft combining mode. The preceding steps provide initial cooperation mode selection at the CUEs according to the CUEs' long term access link quality. At step 310, each CUE then informs the coordinating entity, such as the TUE, a cooperation group gateway, or any other entity, about its mode selection preference.

At step 312, the coordinating entity coordinates the preferences of different CUEs. If at least one CUE selects to operate in D&F mode, then the coordinating entity (e.g., the TUE) configures the entire cooperation group to operate in D&F mode at step 314. Otherwise, selective LLR forwarding is selected and the entire group is configured to operate in selective LLR forwarding mode at step 316. Alternatively, the coordinating entity selects a hybrid mode where different CUEs simultaneously operate in different cooperation modes. In one implementation, the signaling for the coordinated scheme can be conducted as follows. All the CUEs inform the coordinating entity a one bit decision on whether D&F mode or soft combining mode is preferred. The coordinating entity then broadcasts its final decision (e.g., only one bit is needed) to all CUEs on whether the system should work in D&F mode or soft combining mode. In the case of selecting the hybrid mode, the coordinating entity signals a first group of one or more CUEs to operate in one mode, and signals the other group of one or more CUEs to operate in another mode.

Similar to the method 200 for centralized approach, in the method 300, each CUE can be dynamically silenced. Since the short term SINR of each UE may not be reported to the coordinating entity, the silencing can be independently done by the CUE itself based on its own short term access link SINR. In D&F mode, the CUE determines whether it can decode the received signal properly at step 320. If the CUE is capable of decoding, then decoding and forwarding is performed at step 324. If the CUE cannot decode properly, the CUE remains silent at step 322. In soft combining mode, the CUE determines whether access link qualities of all frequency bands (or RBs) are below a certain threshold at step 318. If this condition is true, then selective LLR forwarding is implemented at step 326. If this condition is not satisfied, the CUE remains silent at step 322.

In an embodiment, a hybrid UE cooperation mode selection is adopted, where different CUEs may operate in different cooperation modes simultaneously. Unlike previously described UE cooperation mode selection schemes above where the cooperation mode selection decision is group-based (considers criteria of a group of UEs, such as link quality for CUEs and TUE), in hybrid UE cooperation mode selection, the cooperation mode selection decision is individually-based for each CUE, independent from one UE to another.

Hybrid UE cooperation mode selection can be centralized or distributed depending on whether the CCL or CUEs themselves make the decision on which cooperation mode to operate. In the distributed hybrid UE cooperation mode selection scheme, each CUE makes its own decision on which cooperation mode to operate based on its own access link quality without coordination. In the centralized hybrid UE cooperation mode selection scheme, the CCL decides which cooperation mode to operate for each CUE and informs the CUEs of the decision. The decision can be based on either long term or short term access link quality. If the access link quality of a CUE is above a certain threshold, the CUE operates in D&F mode. Otherwise, it operates in soft combining mode. The CUE also informs the TUE which operation mode it is operating on. For the received signals from CUEs operating in D&F mode, the TUE computes LLRs of encoded bits based on the received signal and D2D channel quality. For the received signals from CUE operating in soft combining mode, the TUE recovers the forwarded soft LLRs. The TUE then combines the LLRs obtained from all CUEs and the direct link together to produce the combined LLRs. The combined LLRs are then sent to the turbo decoder as soft input for decoding.

Figure 4:
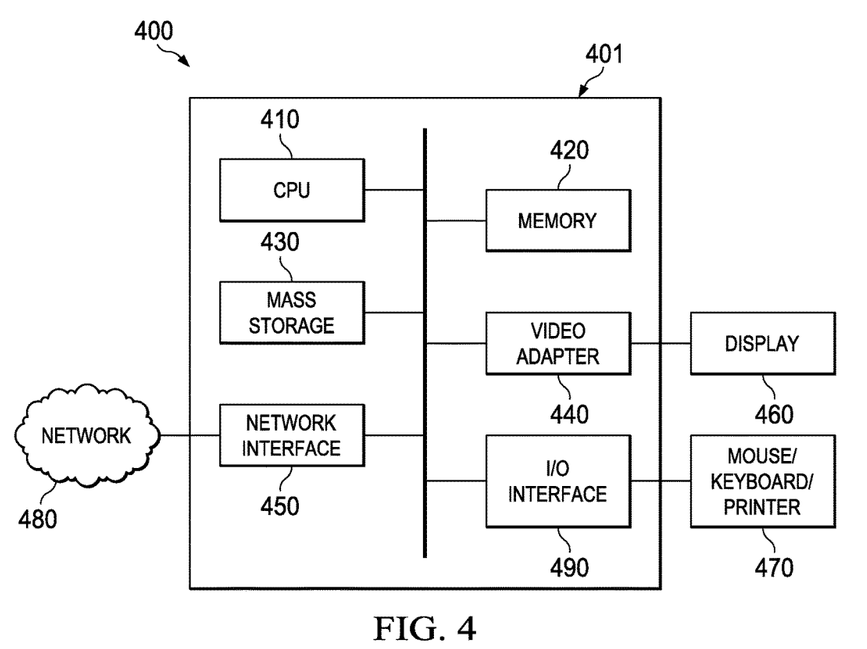
FIG. 4 is a diagram of a processing system that can be used to implement various embodiments.

FIG. 4 is a block diagram of an exemplary processing system 400 that can be used to implement various embodiments. The processing system can be part of a communications system, such as a BS, a CCL, or a UE. In an embodiment, the processing system 400 can be part of a cloud or distributed computing environment, where the different components can be located at separate or remote components from each other and connected via one or more networks. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an Input/Output (I/O) interface 490 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 490 provide interfaces to couple external input and output devices to the processing unit. As illustrated, examples of input and output devices include a display 460 coupled to the video adapter 440 and any combination of mouse/keyboard/printer 470 coupled to the I/O interface 490. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a network component for adaptive user equipment (UE) cooperation mode selection in wireless networks, the method comprising:
obtaining a measured access link quality for a link between a base station of a wireless network and each of a plurality of cooperating UEs (CUEs) for a target UE (TUE) intended to receive signals from the wireless network;
selecting a UE cooperation mode or a hybrid UE cooperation mode from a plurality of supported UE cooperation modes according to the obtained measured access link quality for each of the CUEs; and
instructing one of the plurality of CUEs to cooperate in forwarding the signals to the TUE using the selected UE cooperation mode.

2. The method of claim 1, wherein the plurality of supported UE cooperation modes include a Decode-and-Forward (D&F) mode and a soft UE combining mode, and wherein the soft UE combining mode allows combining, at the TUE, signals forwarded from multiple CUEs.

3. The method of claim 2, wherein the soft UE combining mode comprises frequency selective scheduling (FSS) based selective log likelihood ratio (LLR) forwarding.

4. The method of claim 2, wherein obtaining the measured access link quality for each of the CUEs includes obtaining an interference-plus-noise ratio (SINR) of signals from the wireless network to the CUEs.

5. The method of claim 4, wherein selecting the UE cooperation mode from the plurality of supported UE cooperation modes according to the measured access link quality for each of the CUEs includes:
determining whether the SINR for any of the CUEs is greater than or equal to a predefined threshold; and
selecting the D&F mode for UE cooperation if the SINR of at least one of the CUEs is greater than or equal to the predefined threshold or selecting the soft UE combining mode if the SINR of all the CUEs is less than the predefined threshold.

6. The method of claim 5, wherein the predefined threshold is set to a SINR level that allows the CUEs to decode with acceptable high probability.

7. The method of claim 1, wherein selecting the hybrid UE cooperation mode from the plurality of supported UE cooperation modes according to the measured access link quality for each of the CUEs includes:
selecting a first UE cooperation mode from the supported UE cooperation modes for a first group of at least one of the CUEs; and
selecting a second UE cooperation mode from the supported UE cooperation modes for a second group of at least another one of the CUEs.

8. The method of claim 1, wherein selecting the UE cooperation mode from the plurality of supported UE cooperation modes according to the measured access link quality for each of the CUEs comprises selecting, for the CUEs, one UE cooperation mode from the supported UE cooperation modes according to the measured access link quality of that CUE and independent of other CUEs, and wherein instructing the one of the plurality of CUEs to cooperate in forwarding the signals to the TUE using the selected UE cooperation mode comprises instructing the one of the plurality of CUEs to forward a signal received by that CUE according to the selected UE cooperation mode for the CUE independent of other CUEs.

9. The method of claim 1, wherein the measured access link quality is long term measured access link quality assessed over a relatively long operation time of the CUEs.

10. A network component for adaptive user equipment (UE) cooperation mode selection in wireless networks, the network component comprising:
at least one processor; and
a non-transitory computer readable storage medium storing programming for execution by the processor, the programming including instructions to:
obtain a measured access link quality for a link between a base station of a wireless network and a cooperating UE (CUE) for a target UE (TUE) intended to receive signals from the wireless network;
select a UE cooperation mode or a hybrid UE cooperation mode from a plurality of supported UE cooperation modes according to the measured access link quality for the CUE; and
instruct the CUE to cooperate in forwarding the signals to the TUE using the selected UE cooperation mode.

11. The network component of claim 10, wherein the plurality of supported UE cooperation modes include a Decode-and-Forward (D&F) mode and a soft UE combining mode, and wherein the soft UE combining mode allows combing, at the TUE, signals forwarded from multiple CUEs.

12. The network component of claim 10, wherein the network component is a centralized controller in the wireless network.

13. A method by a network component for adaptive user equipment (UE) cooperation mode selection in wireless networks, the method comprising:
obtaining, from a plurality of cooperating UEs (CUEs) for a target UE (TUE) intended to receive signals from a wireless network, preferences for selecting a UE cooperation mode from a plurality of supported UE cooperation modes, wherein the preferences are determined by the CUEs in accordance with measured access link qualities for links between a base station of a wireless network and the CUEs;
selecting the UE cooperation mode or a hybrid UE cooperation mode from the plurality of supported UE cooperation modes according to the preferences from the CUEs; and
instructing the one of the plurality of CUEs to cooperate in forwarding the signals to the TUE using the selected UE cooperation mode.

14. The method of claim 13, wherein the plurality of supported UE cooperation modes include a Decode-and-Forward (D&F) mode and a soft UE combining mode, and wherein the soft UE combining mode allows combining, at the TUE, signals forwarded from multiple CUEs.

15. The method of claim 14, wherein selecting the UE cooperation mode from the plurality of supported UE cooperation modes according to the preferences from the CUEs includes:
determining whether any of the preferences from the CUEs indicates the D&F mode; and
selecting the D&F mode for UE cooperation if at least one of the preferences from the CUEs indicates the D&F mode or selecting the soft UE combining mode if the preferences of all the CUEs indicate the soft UE combining mode.

16. The method of claim 14, wherein selecting the hybrid UE cooperation mode from the plurality of supported UE cooperation modes according to the preferences from the CUEs includes:
  selecting the D&F mode for a first group of at least one of the CUEs; and
  selecting the soft UE combining mode for a second group of at least another pne of the CUEs.

17. The method of claim 13, wherein the preferences from the CUEs are indicated using a one bit indicator which is set to indicate a first mode of two supported UE cooperation modes or not set to indicate a second mode of the two supported UE cooperation modes.

18. The method of claim 13, wherein the one of the plurality of CUEs is instructed to cooperate using the selected mode by a one bit indicator which is set to indicate a first mode of two supported UE cooperation modes or not set to indicate a second mode of the two supported UE cooperation modes.

19. A network component for adaptive user equipment (UE) cooperation mode selection in wireless networks, the network component comprising:
  at least one processor; and
  a non-transitory computer readable storage medium storing programming for execution by the processor, the programming including instructions to:
    obtain, from a cooperating UE (CUE) for a target UE (TUE) intended to receive signals from a wireless network, preferences for selecting a UE cooperation mode from a plurality of supported UE cooperation modes, wherein the preferences are determined by the CUE in accordance with measured access link quality for a link between a base station of the wireless network and the CUE;
    select the UE cooperation mode or a hybrid UE cooperation mode from the plurality of supported UE cooperation modes according to the preferences from the CUEs; and
    instruct the CUE to cooperate in forwarding the signals to the TUE using the selected UE cooperation mode.

20. The network component of claim 19, wherein the plurality of supported UE cooperation modes include a Decode-and-Forward (D&F) mode and a soft UE combining mode, and wherein the soft UE combining mode allows combining, at the TUE, signals forwarded from multiple CUEs.

21. The network component of claim 19, wherein the network component is the TUE.

22. A method by a user equipment (UE) for adaptive UE cooperation mode selection in wireless networks, the method comprising:
  receiving, from a coordinating entity, an indication to cooperate in forwarding signals to a target UE (TUE) using a selected UE cooperation mode from a plurality of supported UE cooperation modes, wherein the selected UE cooperation mode is in accordance with measured access link qualities for links between a base station of a wireless network and a plurality of cooperating UEs (CUEs); and
  according to a measured access link quality of the UE or the indication from the coordinating entity, performing one of participating in UE cooperation to forward the signals to the TUE or entering a silent mode.

23. The method of claim 22, wherein entering the silent mode includes receiving from a centralized controller an instruction to enter the silent mode upon determining that an interference-plus-noise ratio (SINR) of signals at the TUE is greater than or equal to a predefined threshold.

24. The method of claim 22, wherein entering the silent mode includes receiving from a centralized controller an instruction to enter the silent mode upon determining that a predefined number of CUEs have better access link qualities than the UE and are available for UE cooperation.

25. The method of claim 22, wherein the plurality of supported UE cooperation modes include a Decode-and-Forward (D&F) mode and a soft UE combining mode, and wherein the soft UE combining mode allows combining, at the TUE, signals forwarded from multiple CUEs.

26. The method of claim 25, wherein the silent mode is entered if the selected UE cooperation mode is the D&F mode and the UE is not capable of decoding.

27. The method of claim 25, wherein the silent mode is entered if the selected UE cooperation mode is the soft UE combining mode and measured access link qualities of all considered frequency bands of established links by the UE are below a predefined threshold.

28. The method of claim 22 further comprising, prior to receiving the indication to cooperate in forwarding the signals to the TUE using the selected UE cooperation mode, indicating to the coordinating entity a preferred UE cooperation mode from the supported UE cooperation modes, wherein the preferred UE cooperation mode is in accordance with the measured access link quality of the UE.

29. A user equipment (UE) supporting adaptive UE cooperation mode selection in wireless networks, the UE comprising:
  at least one processor; and
  a non-transitory computer readable storage medium storing programming for execution by the processor, the programming including instructions to:
    receive, from a coordinating entity, an indication to cooperate in forwarding signals to a target UE (TUE) using a selected UE cooperation mode from a plurality of supported UE cooperation modes, wherein the selected UE cooperation mode is in accordance with a measured access link quality for a link between a base station of a wireless network and the UE; and
  according to the measured access link quality of the UE or the indication from the coordinating entity, perform one of participating in UE cooperation to forward the signals to the TUE or entering a silent mode.

30. The UE of claim 29, wherein the plurality of supported UE cooperation modes include a Decode-and-Forward (D&F) mode and a soft UE combining mode, and wherein the soft UE combining mode allows combining, at the TUE, signals forwarded from multiple CUEs.

31. A method by a user equipment (UE) for adaptive cooperation mode selection in wireless networks, the method comprising:
  selecting, according to a measured access link quality for a link between a base station of a wireless network and the UE, a UE cooperation mode from a plurality of supported UE cooperation modes for forwarding signals by multiple cooperating UEs (CUEs) to a target UE (TUE), wherein the UE is one of the CUEs, and wherein the UE cooperation mode is selected by the UE independently of other CUEs; and
  informing the TUE of the selected UE cooperation mode.

32. The method of claim 31, wherein the plurality of supported UE cooperation modes include a Decode-and-Forward (D&F) mode and a soft UE combining mode, and wherein the soft UE combining mode allows combining, at the TUE, signals forwarded from multiple CUEs.

33. The method of claim 32, wherein selecting, according to the measured access link quality of the UE, the UE cooperation mode from the plurality of supported UE cooperation modes includes:
   determining whether an interference-plus-noise ratio (SINR) at the UE is greater than or equal to a predefined threshold; and
   selecting the D&F mode for UE cooperation if the SINR is greater than or equal to the predefined threshold or selecting the soft UE combining mode if the SINR is less than the predefined threshold.

34. A user equipment (UE) for adaptive cooperation mode selection in wireless networks, the UE comprising:
   at least one processor; and
   a non-transitory computer readable storage medium storing programming for execution by the processor, the programming including instructions to:
      select, according to a measured access link quality for a link between a base station of a wireless network and the UE, a UE cooperation mode from a plurality of supported UE cooperation modes for forwarding signals by multiple cooperating UEs (CUEs) to a target UE (TUE), wherein the UE is one of the CUEs, and wherein the UE cooperation mode is selected by the UE independently of other CUEs; and
      inform the TUE of the selected UE cooperation mode.

35. The UE of claim 34, wherein the instructions to select, according to the measured access link quality of the UE, the UE cooperation mode from the plurality of supported UE cooperation modes include instructions to:
   determine whether an interference-plus-noise ratio (SINR) at the UE is greater than or equal to a predefined threshold; and
   select a Decode-and-Forward (D&F) mode for UE cooperation if the SINR is greater than or equal to the predefined threshold or select a soft UE combining mode if the SINR is less than the predefined threshold.

* * * * *